US012681733B2

(12) United States Patent
Paulraj et al.

(10) Patent No.: US 12,681,733 B2
(45) Date of Patent: Jul. 14, 2026

(54) MANAGING MODIFICATIONS TO DATA PROCESSING SYSTEMS BASED ON CHANNEL CARD PARAMETERS

(71) Applicant: Dell Products L.P., Round Rock, TX (US)

(72) Inventors: Deepaganesh Paulraj, Bangalore (IN); Vinod Parackal Saby, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 18/785,268

(22) Filed: Jul. 26, 2024

(65) Prior Publication Data

US 2026/0030030 A1      Jan. 29, 2026

(51) Int. Cl.
*G06F 9/44*          (2018.01)
*G06F 9/4401*        (2018.01)
(52) U.S. Cl.
CPC .................................. *G06F 9/4401* (2013.01)
(58) Field of Classification Search
CPC ..................................................... G06F 9/4401
See application file for complete search history.

(56) References Cited

U.S. PATENT DOCUMENTS

| | | | |
|---|---|---|---|
| 6,976,087 | B1 | 12/2005 | Westfall |
| 7,024,593 | B1 | 4/2006 | Budd |
| 7,089,335 | B2 | 8/2006 | Aiken |
| 7,555,421 | B1 | 6/2009 | Beckett |

| | | | |
|---|---|---|---|
| 7,974,286 | B2 | 7/2011 | Keohane et al. |
| 8,826,307 | B2 | 9/2014 | Nagampalli |
| 10,027,678 | B1 | 7/2018 | Brandwine |
| 10,075,334 | B1 | 9/2018 | Kozura |
| 11,252,192 | B1 | 2/2022 | Kwan |
| 11,868,551 | B1 | 1/2024 | Pelissier |
| 2004/0025036 | A1 | 2/2004 | Balard |
| 2004/0128514 | A1 | 7/2004 | Rhoads |

(Continued)

OTHER PUBLICATIONS

Integrated Dell Remote Access Controller 9 User's Guide Published Dec. 2021 (368 pages).

(Continued)

*Primary Examiner* — Zahid Choudhury
(74) *Attorney, Agent, or Firm* — WOMBLE BOND DICKINSON (US) LLP

(57)          ABSTRACT

Methods and systems for managing operation of a data processing system are disclosed. Channel cards of the data processing system may be non-standard channel cards that perform non-standard functions. If a channel card is a non-standard channel card, it may be determined whether any modifications are to be made to the data processing system to facilitate cooperative operation of the hardware resources with respect to the non-standard channel card. At least one modification may be obtained based on parameters of the channel card and parameters of the data processing system. The at least one modification may be made to configurations of the channel card, a manner in which other components interact with the channel card, a user-facing description of the channel card, and/or other aspects of the data processing system. Doing so may increase a likelihood of providing computer-implemented services to a user of the data processing system as desired.

20 Claims, 7 Drawing Sheets

(56) References Cited

U.S. PATENT DOCUMENTS

| | | | |
|---|---|---|---|
| 2005/0048924 A1 | 3/2005 | Nelson | |
| 2005/0078088 A1 | 4/2005 | Davis | |
| 2006/0143543 A1 | 6/2006 | Mandrell | |
| 2006/0285502 A1 | 12/2006 | Bigioi | |
| 2008/0226005 A1* | 9/2008 | Kim | H04J 3/0685 |
| | | | 375/354 |
| 2009/0014519 A1 | 1/2009 | Singh | |
| 2009/0069049 A1 | 3/2009 | Jain | |
| 2009/0265720 A1 | 10/2009 | Nagampalli | |
| 2012/0257118 A1 | 10/2012 | Aotake | |
| 2013/0117766 A1 | 5/2013 | Bax | |
| 2013/0283380 A1 | 10/2013 | Thadikaran | |
| 2014/0108693 A1* | 4/2014 | Minezaki | G06F 9/4403 |
| | | | 710/300 |
| 2015/0213355 A1 | 7/2015 | Sharma | |
| 2016/0050071 A1 | 2/2016 | Collart | |
| 2016/0142243 A1 | 5/2016 | Karam | |
| 2016/0173578 A1 | 6/2016 | Sharma | |
| 2019/0306018 A1 | 10/2019 | Steverson | |
| 2019/0342079 A1 | 11/2019 | Rudzitis | |
| 2020/0042709 A1 | 2/2020 | Fu | |
| 2020/0322176 A1 | 10/2020 | Bhandari | |
| 2020/0344325 A1 | 10/2020 | Sarisky | |
| 2020/0396128 A1 | 12/2020 | Tseng | |
| 2021/0097186 A1 | 4/2021 | Mandal | |
| 2021/0120104 A1 | 4/2021 | Al-Mufti | |
| 2021/0181817 A1* | 6/2021 | Lu | G06F 1/20 |
| 2022/0027165 A1* | 1/2022 | Juan | G06F 21/572 |
| 2022/0035685 A1 | 2/2022 | Ghosh | |
| 2022/0091744 A1 | 3/2022 | Kutner | |
| 2022/0100840 A1 | 3/2022 | Shtalenkov | |
| 2022/0121619 A1 | 4/2022 | Sharma | |
| 2022/0151022 A1 | 5/2022 | Chikkur Dattatraya | |
| 2022/0207463 A1 | 6/2022 | Young | |
| 2023/0259632 A1 | 8/2023 | Marciano | |
| 2023/0328037 A1 | 10/2023 | Sankaranarayanan | |
| 2024/0095328 A1 | 3/2024 | Ponsini | |
| 2024/0267251 A1 | 8/2024 | Mishelevich | |
| 2025/0148078 A1 | 5/2025 | Lal | |

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

* cited by examiner

MANAGING MODIFICATIONS TO DATA PROCESSING SYSTEMS BASED ON CHANNEL CARD PARAMETERS

FIELD

Embodiments disclosed herein relate generally to managing operation of data processing systems. More particularly, embodiments disclosed herein relate to systems and methods to manage modifications to data processing systems based on at least channel card parameters.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
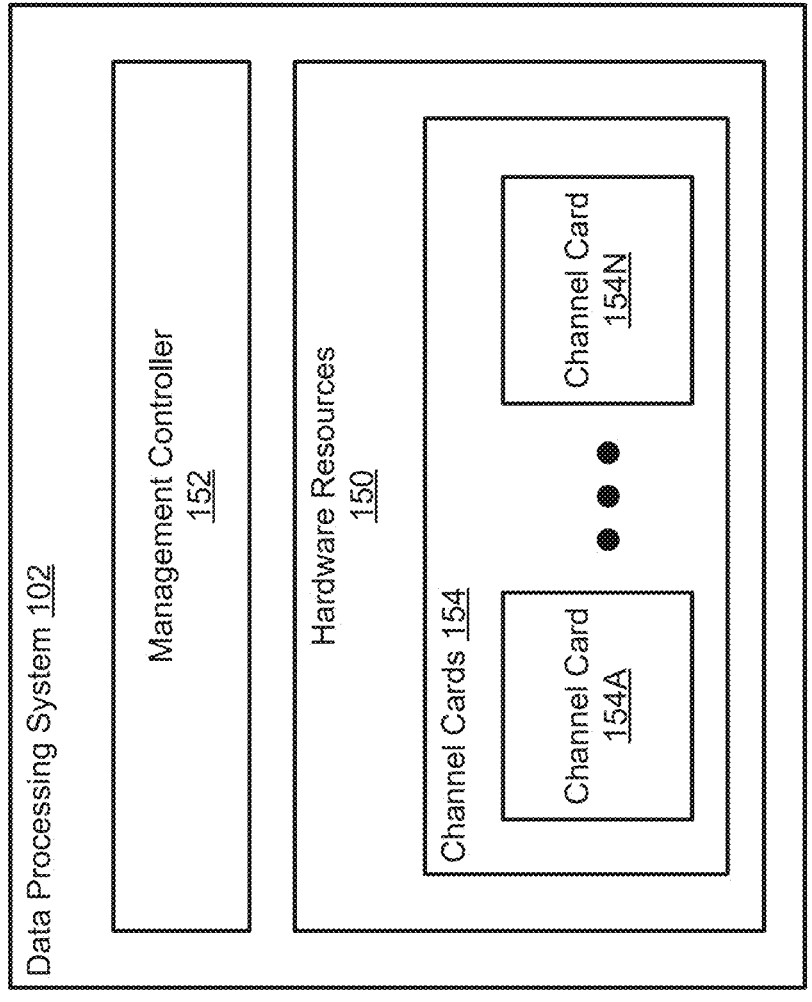
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services. To provide the computer-implemented services, hardware resources of the data processing system such as memory modules, processors, channel cards, etc., may operate in cooperation with one another.

For example, a processor of the data processing system may interact with a channel card of the data processing system to facilitate provision of the computer-implemented services. The channel card may include, for example, a graphics card (e.g., a graphics processing unit (GPU)), a sound card, a storage card, and/or other types of hardware components of the data processing system that may be added, removed and/or replaced.

Over time (e.g., after a user obtains the data processing system from the manufacturer), stock hardware components of the data processing system (e.g., hardware components added at the time of manufacturing by the manufacturer of the data processing system) may be modified. For example, the user may replace a stock channel card of the data processing system with an aftermarket channel card.

The stock channel card may include standard functions (e.g., known functionality, based on a current or preceding industry standard for a type of the channel card). The aftermarket channel card may include the standard functions and non-standard functions. The non-standard functions may be additional to those of the industry standard (e.g., functionality not known by the other stock hardware components).

However, modification of a stock hardware component may adversely impact the cooperative operation of the hardware resources and, subsequently, provision of the computer-implemented services to the user. For example, if a stock channel card is replaced with an aftermarket channel card, any firmware, drivers, and/or configuration settings associated with the channel card may be required to be updated so that the hardware resources may continue to operate cooperatively. Specifically, the functions of the aftermarket channel card may not be natively invokable via commands issued by the other hardware components, error messages based on functionality of the aftermarket channel card may not be interpretable by the other hardware components, commands intended for the aftermarket channel card may not be received by the aftermarket channel card, and/or the aftermarket channel card may otherwise not operate as desired.

In addition, during use of the data processing system by a user, functions of channel cards may be presented (e.g., by software applications) to the user (e.g., via a user interface such as a graphical user interface (GUI)). However, addition of a non-standard channel card (e.g., the aftermarket channel card) may modify a manner in which the functions are presented to the user. Consequently, functions may not be presented to the user and/or the functions may be presented to the user in a manner that the user does not recognize (e.g., an unfamiliar name, an unfamiliar icon). Therefore, the user experience may be negatively impacted.

To overcome the above-discussed challenges, at least one modification may be made to the data processing system by a management entity (e.g., a management controller) of the data processing system. For example, modifications may be made to: (i) configurations of the channel card, (ii) means of communication between other components of the data processing system (e.g., the management controller) and the channel card, (iii) a manner in which information regarding functions of the channel card is presented to a user, and/or (iv) other aspects of the operation of the data processing system.

Thus, an improved system may be obtained where modifications may be made to improve cooperative operation of hardware components of the data processing system with respect to a non-standard channel card. Doing so may increase a quality and/or reliability of the computer-implemented services provided to the user of the data processing system.

In an embodiment, a method for managing operation of a data processing system is provided. The method may include: obtaining, by a management controller of the data processing system, parameters of a channel card of the data processing system, the channel card having at least one non-standard function based on standard functions of a type of the channel card; identifying, by the management controller and based on the parameters of the channel card and parameters of the data processing system, at least one modification to the data processing system; performing, by the management controller and based on the at least one modification, an action set to update operation of the data processing system; and providing computer-implemented services based on the updated operation of the data processing system.

The parameters of the channel card may include at least one parameter selected from a list of parameters consisting of: the type of the channel card; a manufacturer of the channel card; hardware components of the channel card; and firmware of the channel card.

Identifying the at least one modification may include: identifying a desired manner of operation of the channel card when operably connected to the data processing system; evaluating, based on the parameters of the channel card and the parameters of the data processing system, a set of operational scenarios to obtain operation scenario outcomes; comparing the operation scenario outcomes to the desired manner of operation; and in an instance of the comparing where at least one of the operation scenario outcomes does not meet the desired manner of operation: identifying a change in configuration for the channel card that, when applied to channel card, reduces a likelihood of additional instances of the comparing from occurring to obtain the at least one modification.

Performing the action set may include: applying, by the management controller and based on the at least one modification, the identified change in configuration for the channel card.

Identifying the at least one modification may include: identifying a desired operation to be performed by the management controller and with respect to the channel card during startups of the data processing system; identifying at least one restriction placed on the channel card during the startups; and identifying, based on the at least one restriction, a manner for completing the desired operation during the startups.

The desired operation may be retrieval, by the management controller, of diagnostic data from the channel card.

Performing the action set may include: updating a diagnostic data retrieval plan of the management controller based on the identified manner for completing the desired operation.

The at least one restriction may be a limit on types of communication mechanisms available during the startups.

Identifying the at least one modification may include: identifying a function of the channel card that corresponds to a standard function of the standard functions, the function having a user-facing description that differs from a user-facing description of the standard function.

Performing the action set may include at least one action selected from a list of actions consisting of: modifying a name of the function based on a name of the corresponding standard function; and modifying an icon for the function based on an icon for the corresponding standard function.

Performing the action set may include modifying a manner in which an application presents information regarding the function to a user of the data processing system, the application utilizing the channel card during operation.

At least the obtaining, identifying, and performing may be performed via a sideband channel of the data processing system.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, data generation services, and/or any other type of service that may be implemented with a computing device. The computer-implemented services may be provided, at least in part, using various hardware components of hardware resources of the data processing system, such as channel cards (e.g., graphics cards, network interface cards (NICs), accelerator cards, expansion cards).

To provide the computer-implemented services, hardware components of the data processing system may interact with one another cooperatively. For example, the computer-implemented services may be based on cooperative interactions between processors, memory modules, storage devices, and/or the channel cards. Based on these interactions, the hardware components may support execution of any number and/or types of software components (e.g., applications hosted by the hardware components), and, in some combination, the hardware and software components may provide for various types of computer-implemented services.

The interactions between the hardware and/or software components may depend on the presence of appropriate firmware, drivers, configuration data, and/or configuration settings of the data processing system that support the cooperative interactions. For example, a channel card of the data processing system may require that specialized firmware be installed to the data processing system, and the specialized firmware may define commands that, when issued to the channel card, may activate a function of the channel card necessary for providing desired computer-implemented services. Thus, during setup (e.g., manufacturing) of the data processing systems, the appropriate firmware, drivers, configuration data, and/or configuration settings that reflect functionality of existing (e.g., stock) hardware components of the data processing system may be installed.

However, over time (e.g., after manufacturing or setup), hardware components such as channel cards may be modified (e.g., by a user). For example, a stock channel card may be replaced with an aftermarket channel card, and/or aftermarket channel cards may be added to the data processing system. Functionality of the aftermarket channel cards may vary to a high degree depending on their vendor (e.g., manufacturer of the channel card) and/or due to the programmable nature of some channel cards (SmartNICs, data processing unit (DPU) cards, etc.).

For example, channel cards may include programmable platform devices capable of performing various functions in various different ways and/or some may require special methods of communication (e.g., specialized application programming interfaces (APIs)). In other words, some functionality of the channel cards (i) may not adhere to an industry standard for similar types of channel cards, (ii) may be in addition to the functionality specified by the industry standard, and/or (iii) may otherwise require specialized or unusual information to utilize such functions. These functions may be referred to as non-standard functions.

Therefore, a manner of operation of the data processing system with respect to a channel card may be impacted following operable connection of a non-standard channel card (e.g., a channel card with at least one non-standard function) to the data processing system.

In a first example, stock hardware components (e.g., standard channel cards, other stock hardware components such as a stock memory module) may be configured to operate cooperatively to facilitate provisioning of the computer-implemented services. However, if a stock channel card is replaced with a non-standard channel card, the non-standard channel card may have different configurations than the stock channel card and, therefore, operations that may rely on cooperative interactions with the channel card may be interrupted.

In a second example, configurations, firmware, and/or hardware components of channel cards may impact how startup management entities interact with the channel cards during startups for the data processing system. However, a non-standard channel card may have unique hardware components, configurations, and/or other restrictions that may modify how the startup management entities are able to interact with the non-standard channel card during the startups. Therefore, the startup management entity and/or other hardware components that participate in the startups may be unable to perform various operations (e.g., security verifications, diagnostic data retrieval) and, consequently, functionality of the channel card may become limited and/or unavailable.

In a third example, a user-facing description of a stock channel card (e.g., a manner in which a software application presents functions of the stock channel card to a user of the data processing system) may be selected by a manufacturer of the stock channel card. The user-facing description may include names of functions, icons for functions, descriptions of functions, and/or other information that may be presented to the user via a user interface (e.g., a GUI). Although a non-standard channel card may include functionality to perform standard functions of a stock channel card, a manufacturer of the non-standard channel card may select a user-facing description that differs from the user-facing description of the stock channel card. Therefore, a user's experience with the data processing system may be adversely impacted due to inconsistencies in the user-facing descriptions of functions available to the user.

In general, embodiments disclosed herein may provide methods, systems, and/or devices for managing operation of data processing systems in a manner that increases a likelihood of providing the computer-implemented services as desired by a downstream consumer of the computer-implemented services (e.g., the user of the data processing system). To do so, modifications may be made to the data processing system following operable connection of a non-standard channel card, the modifications being managed by a management entity (e.g., a management controller).

To do so, following an identification (e.g., by a startup management entity such as a basic input/output system (BIOS)) that a channel card is a non-standard channel card, at least one modification to the data processing system may be identified. The at least one modification may be intended to increase a likelihood that a manner of operation of the data processing system meets (e.g., to an extent considered acceptable) a desired manner of operation of the data processing system.

The modifications may impact: (i) configurations of the channel card, (ii) configurations of other hardware components of the data processing system, (iii) a manner in which the management entity (and/or other components of the data processing system) communicates with the channel card, (iv) a manner in which the functions of the channel card are presented to a user of the data processing system (e.g., via a software application), and/or (v) other aspects of the operation of the data processing system while operably connected to the channel card.

To provide the above-mentioned functionality, data processing system 102 may include hardware resources 150 and/or management controller 152. Data processing system 102, any components thereof and/or any other types of devices or components not shown in FIG. 1A may perform all, or a portion of the computer-implemented services independently and/or cooperatively. Each of these components is discussed below.

Hardware resources 150 may include any number of hardware components (e.g., memory, processors, channel cards). For example, hardware resources 150 may include any number of channel cards 154 (e.g., 154A-154N). Channel cards 154 may include expansion cards and/or adapter cards that may add specific functions to data processing system 102. Each channel card of channel cards 154 may be designed to perform a specific task and/or provide additional capabilities to data processing system 102 (e.g., beyond what other hardware components such as a motherboard of data processing system 102 may offer). For example, channel cards 154 may include graphics processing units (GPUs), network interface cards (NICs), storage controller cards, wireless network cards, Universal Serial Bus (USB) expansion cards, and/or other types of cards.

Channel cards 154 may include any number of stock channel cards (e.g., installed by and/or manufactured by a manufacturer of data processing system 102) and/or aftermarket channel cards (e.g., added by a user of data processing system 102) and, therefore, may include a heterogeneous set of channel cards. Channel cards 154 may function in cooperation with other components of hardware resources 150.

Hardware resources 150 may host applications and/or other software, and may store and/or execute instructions provided by the applications and/or the software in order to facilitate provision of a computer-implemented service.

Management controller 152 may be separate from and tasked with managing operation of hardware resources 150. For example, following identification that a channel card (e.g., 154A) is a non-standard channel card, management controller 152 may manage modifications to data processing system 102 to facilitate cooperative operation of hardware resources 150. To perform its functionality, management controller 152 may: (i) obtain parameters of a channel card (e.g., 154A) of data processing system 102, (ii) identify, based on the parameters of channel card 154A and parameters of data processing system 102, at least one modification to data processing system 102, (iii) perform, based on the at least one modification, an action set to update operation of data processing system 102, and/or (iv) perform other actions.

Management controller 152 may obtain the parameters of channel card 154A upon receipt of a notification (e.g., from a BIOS of data processing system 102) that channel card 154A has been operably connected to data processing system 102 and/or at any other time following connection of channel card 154A. For example, management controller 152 may monitor hardware components of data processing system 102 at regular intervals and/or in response to a request to do so.

The parameters of channel card 154A may include: (i) a type of the channel card (e.g., a class of channel card such as a graphics card), (ii) a manufacturer of the channel card, (iii) hardware components of the channel card, (iv) firmware of the channel card, (v) configurations of the channel card, and/or (vi) other parameters.

The parameters of data processing system 102 may be similar to the parameters of channel card 154A (e.g., a manufacturer, hardware components, firmware, configurations).

In a first example, identifying the at least one modification may include: (i) identifying a desired manner of operation of the channel card when operably connected to the data processing system, (ii) evaluating, based on the parameters of the channel card and the parameters of the data processing system, a set of operational scenarios to obtain operation scenario outcomes, (iii) comparing the operation scenario outcomes to the desired manner of operation, and (iv) if at least one of the operation scenario outcomes does not meet the desired manner of operation, identifying a change in configuration for the channel card that, when applied to a channel card, reduces a likelihood of additional instances of the comparing from occurring to obtain the at least one modification.

In a second example, identifying the at least one modification may include: (i) identifying a desired operation to be performed by the management controller and with respect to the channel card during startups of the data processing system, (ii) identifying at least one restriction placed on the channel card during the startups, and (iii) identifying, based on the at least one restriction, a manner for completing the desired operation during the startups.

In a third example, identifying the at least one modification may include identifying a function of the channel card that corresponds to a standard function of the standard functions, the function having a user-facing description that differs from a user-facing description of the standard function.

Figure 2A:
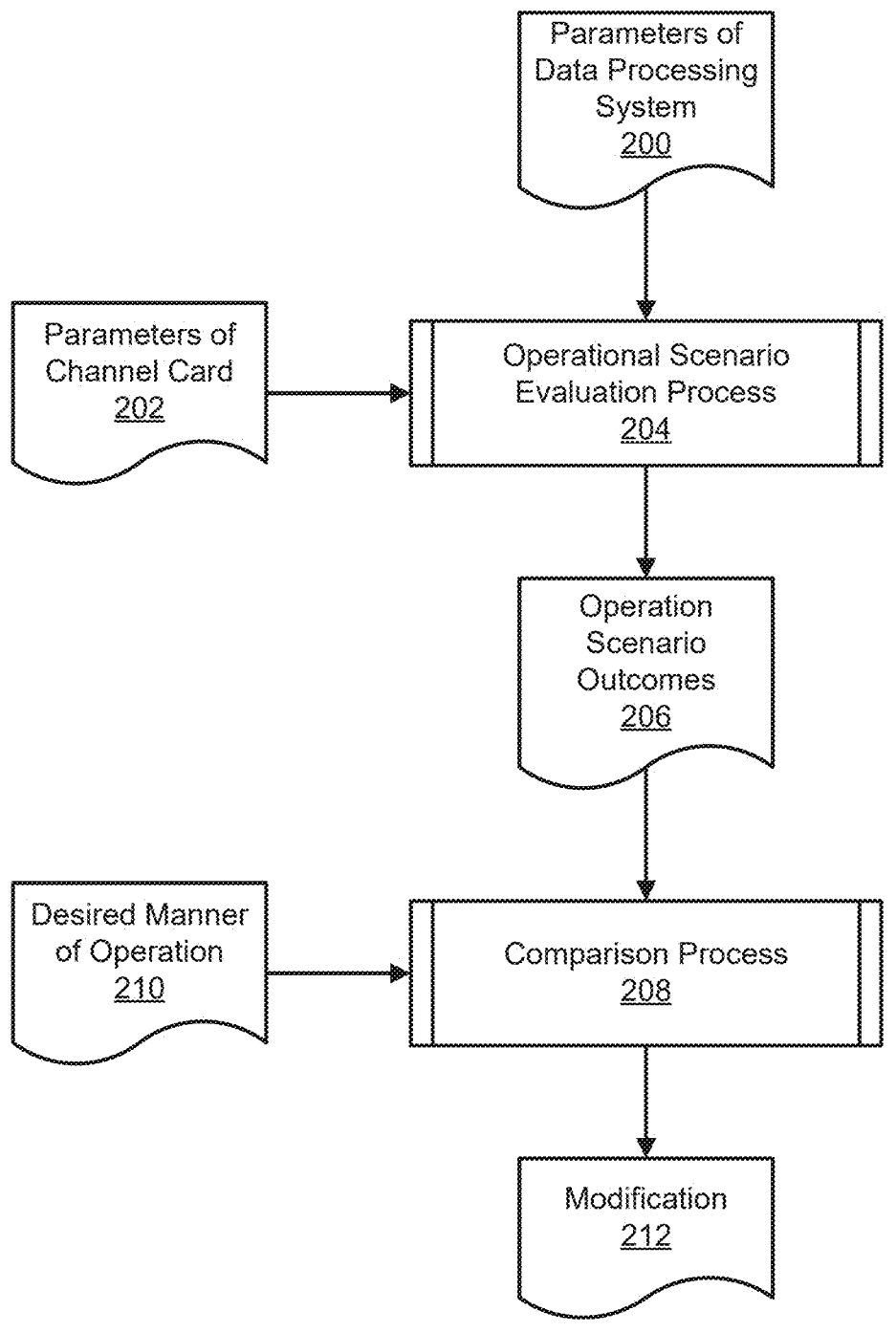
FIG. 2A shows a data flow diagram illustrating management of modifications to channel card configurations in accordance with an embodiment.

In the first example, performing the action set may include applying, by the management controller and based on the at least one modification, the identified change in configuration for the channel card. Refer to FIG. 2A for additional details regarding the first example.

Figure 2B:
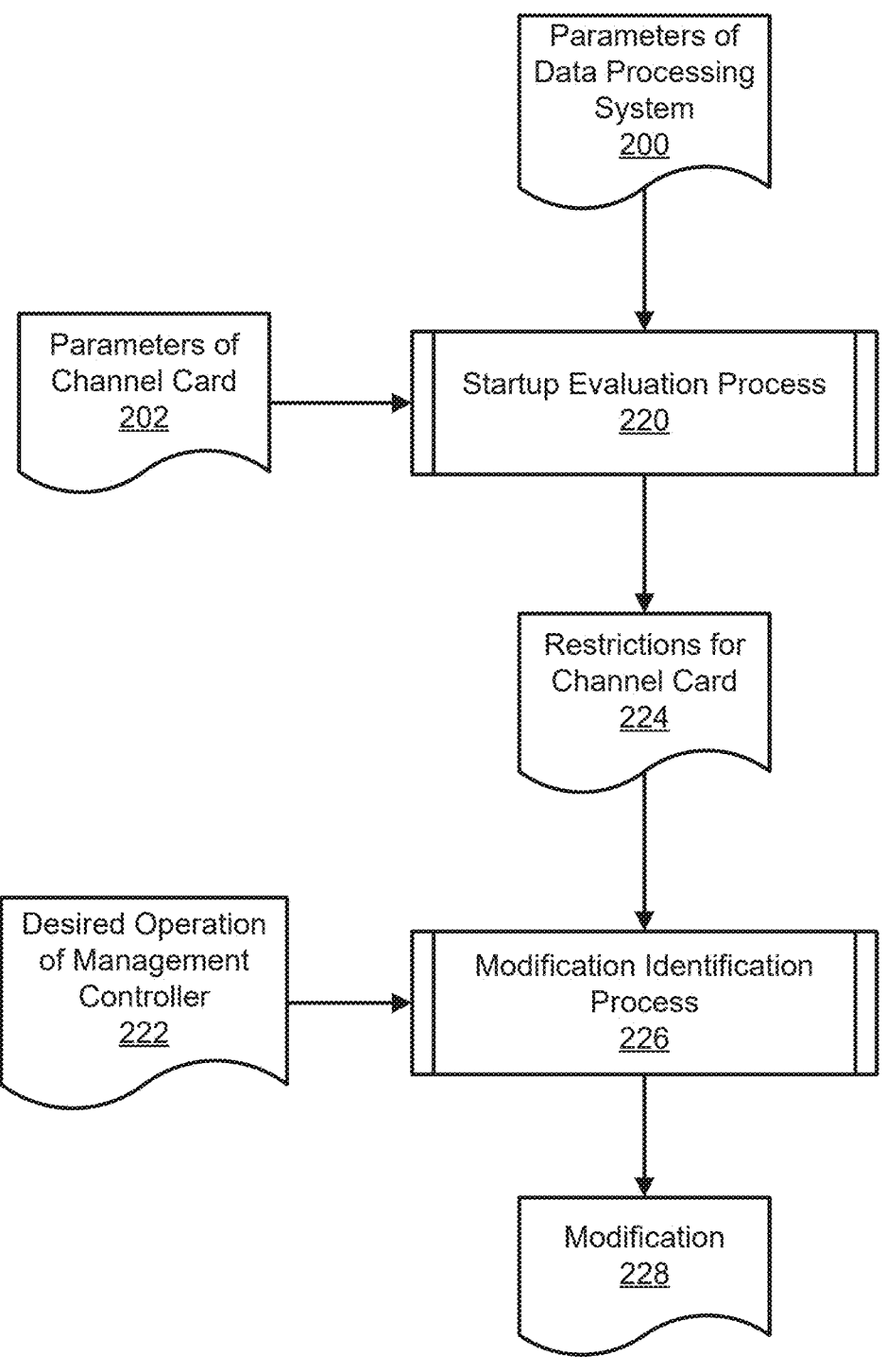
FIG. 2B shows a data flow diagram illustrating management of startups of a data processing system in accordance with an embodiment.

In the second example, performing the action set may include updating a diagnostic data retrieval plan of the management controller based on the identified manner for completing the desired operation. Refer to FIG. 2B for additional details regarding the second example.

Figure 2C:
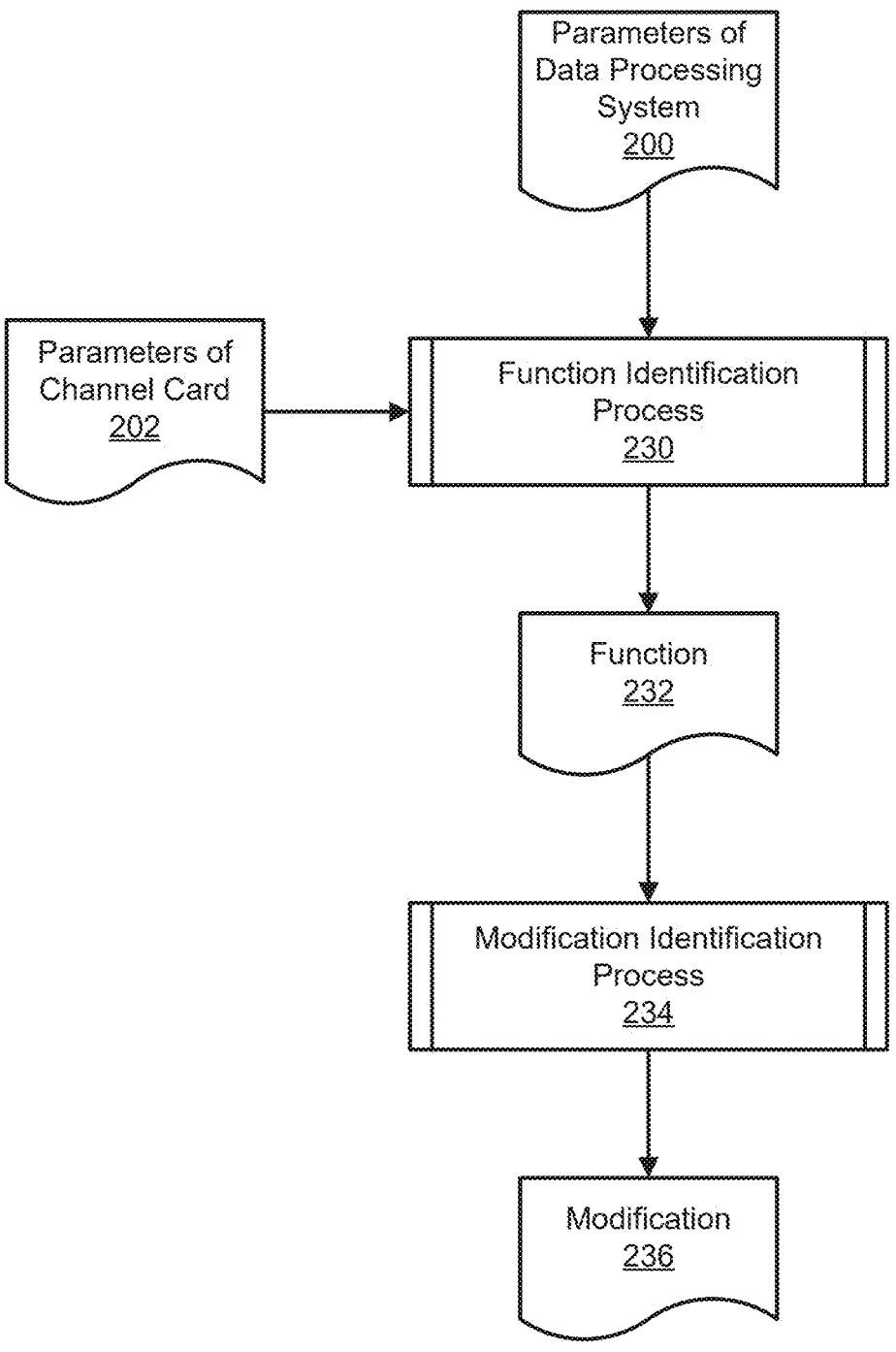
FIG. 2C shows a data flow diagram illustrating management of user-facing descriptions of channel cards in accordance with an embodiment.

In the third example, performing the action set may include: (i) modifying a manner in which an application presents information regarding the function to a user of the data processing system, the application utilizing the channel card during operation, (ii) modifying a name of the function based on a name of the corresponding standard function, (iii) modifying an icon for the function based on an icon for the corresponding standard function, and/or (iv) other actions. Refer to FIG. 2C for additional details regarding the third example.

By doing so, a likelihood that functionality of channel card 154A is available to the user may be increased and a manner of operation of data processing system 102 may be improved (e.g., may be more likely to meet a desired manner of operation of data processing system 102). Therefore, a quality and/or reliability of the computer-implemented services provided based on the operation of data processing system 102 may be increased for the user.

Management controller 152 may be distinct from and may operate independently from hardware resources 150. To facilitate cooperation between hardware resources 150 and management controller 152, hardware resources 150 may host an agent for management controller 152 (not shown). The agent (e.g., a software program) may facilitate communication between management controller 152 and hardware resources 150. As modifications to data processing system 102 are managed by management controller 152 (rather than in-band components of data processing system 102), a likelihood that a malicious entity may manipulate operation of hardware resources 150 may be reduced). Refer to the discussion of FIG. 1B for more information regarding the functionality of management controller 152.

Figure 3:
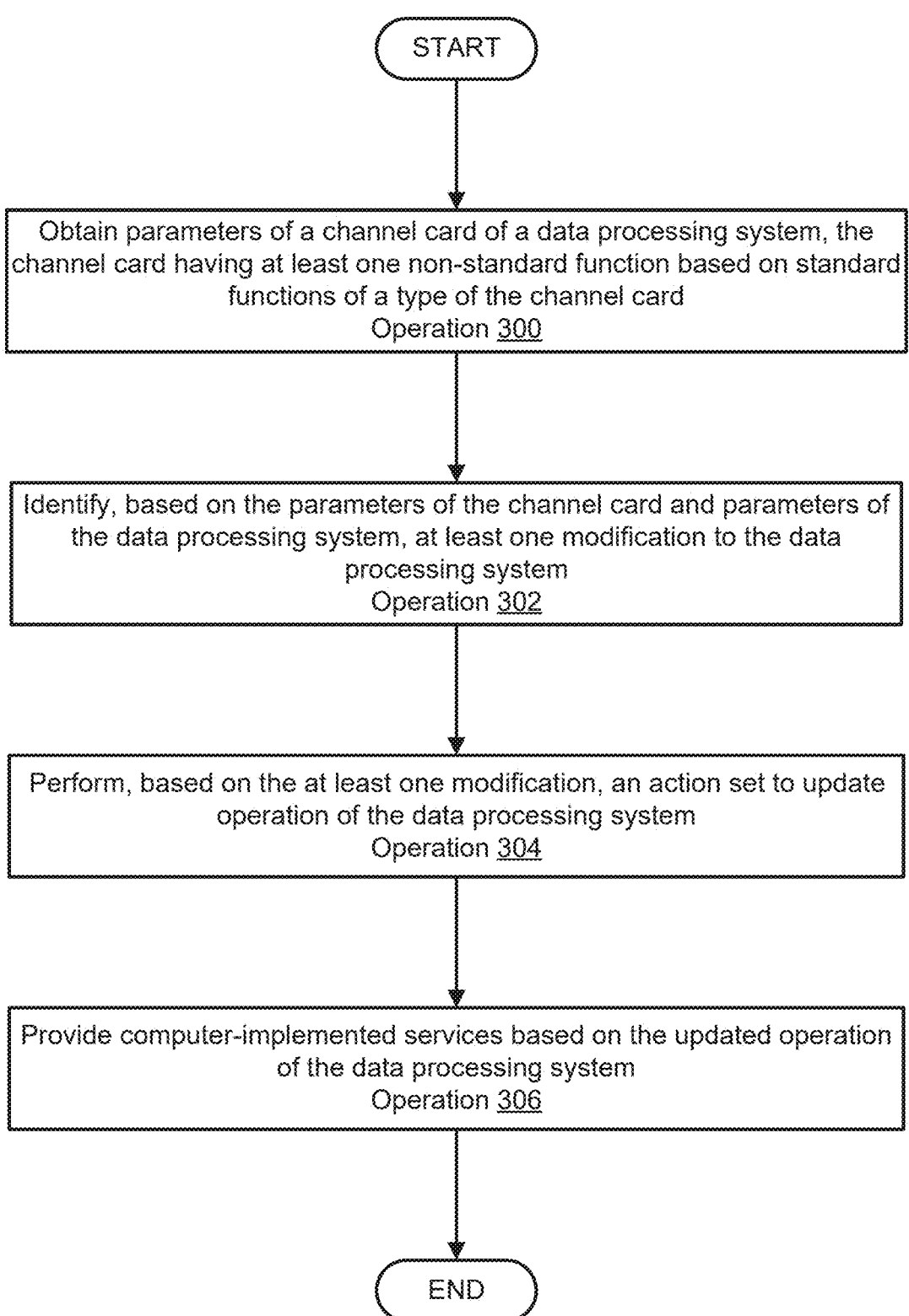
FIG. 3 shows a flow diagram illustrating a method in accordance with an embodiment.

When providing their functionality, any components of data processing system 102 may perform all, or a portion of the actions and methods illustrated in FIGS. 2A-3.

Data processing system 102 (and/or components thereof) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

While illustrated in FIG. 1A as including a limited number of specific components, a system in accordance with an embodiment may include fewer, additional, and/or different components than those illustrated therein.

Figure 1B:
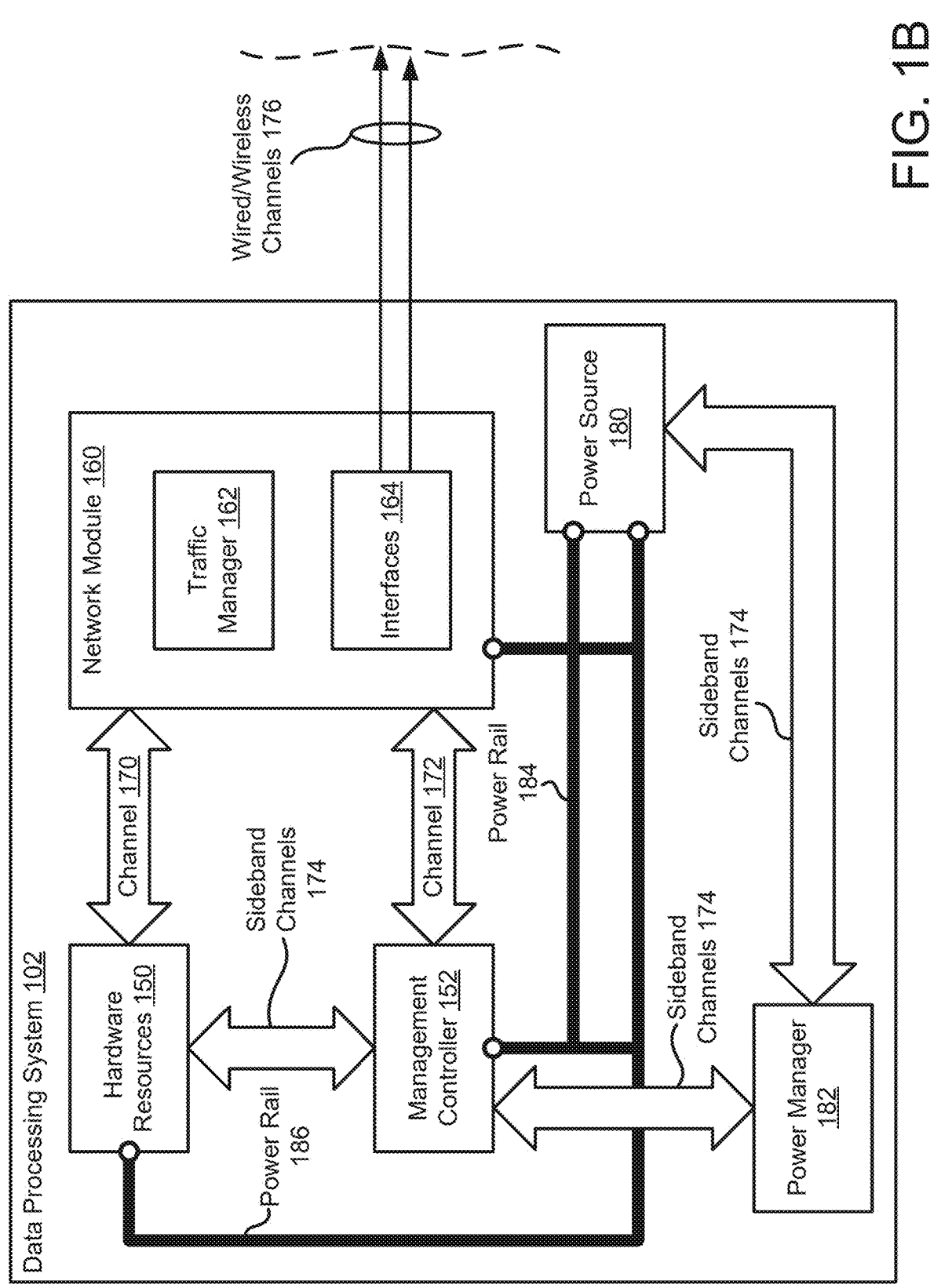
FIG. 1B shows a block diagram illustrating components of a data processing system in accordance with an embodiment.

Turning to FIG. 1B, a diagram illustrating components of a data processing system in accordance with an embodiment is shown. The components of the data processing system shown in FIG. 1B may be similar to those of the system shown in FIG. 1A.

To provide computer-implemented services, data processing system 102 may include any quantity of hardware resources 150. Hardware resources 150 may be in-band hardware components, and may include a processor operably coupled to memory, storage, channel cards, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150, of a host data processing system 102). Management controller 152 may provide various management functionalities for data processing system 102. For example, management controller 152 may monitor various ongoing processes performed by the in-band components, may manage power distribution, may participate in thermal management, and/or other may perform other functions, such as managing operation of channel cards operably connected to data processing system 102 and, subsequently, operation of data processing system 102 with respect to the channel cards.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, sideband channels 174 may facilitate communications between management controller 152 and hardware resources 150 so that management controller 152 may identify standard and/or non-standard functions of channel cards added to data processing system 102, modify configurations of the channel cards, modify configurations of software hosted by any of hardware resources 150, and/or otherwise manage functionality of hardware resources 150.

To reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any portion of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system. Network module 160 may, for example, host a transmission control protocol/internet protocol (TCP/IP) stack to facilitate network communications via in-band and/or out-of-band communication channels. To do so, network module 160 may include traffic manager 162 and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints.

For example, an out-of-band communication channel (e.g., 172) that services management controller 152 and an in-band communication channel (e.g., 170) that services hardware resources 150 may run through network module 160. Therefore, other entities may address communications to hardware resources 150 via the in-band communication channel (e.g., 170) and to management controller 152 via the out-of-band communication channel (e.g., 172).

When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176.

Thus, from the perspective of an external device, the in-band components and the out-of-band components of data processing system 102 may appear to be two independent network entities, that may independently addressable, and otherwise unrelated to one another.

To facilitate management of data processing system 102 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, and power may be supplied via the power rails. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 202, etc.) is used to represent data structures and a second set of shapes (e.g., 204, 208, etc.) is used to represent processes performed using and/or that generate data.

Turning to FIG. 2A, a first data flow diagram in accordance with an embodiment is shown. The first data flow diagram may illustrate data used in and data processing performed in a first example of identifying a modification to be made to a data processing system with respect to a channel card operably connected to the data processing system.

Consider a scenario in which a channel card operably connected to a data processing system is a non-standard channel card (e.g., performs at least one function in addition to functions based on an industry standard for a type of the channel card). For example, the type of the channel card may be a GPU (e.g., a graphics card).

Following operable connection of the graphics card to the data processing system, a management controller of the data processing system may determine whether modifications are to be made to configurations of the channel card to increase a likelihood of a manner of operation of the data processing system meeting (e.g., within a threshold considered acceptable) a desired manner of operation for the data processing system.

To do so, the management controller may obtain parameters of data processing system 200 and parameters of channel card 202. Parameters of data processing system 200 may include information regarding components and current configurations for the data processing system. For example, parameters of data processing system 200 may include: (i) a serial number for the data processing system, (ii) a manufacturer of the data processing system, (iii) a list of hardware components of the data processing system, (iv) firmware and/or software installed on hardware components of the data processing system, (v) configurations and/or other settings for the firmware, software, and/or hardware components, (vi) communication channels available to interact with various hardware and/or software components, and/or (viii) other information.

Parameters of channel card 202 may include information related to the non-standard channel card. For example, parameters of channel card 202 may include: (i) a type of the channel card (e.g., a class of the channel card such as a GPU), (ii) a manufacturer of the channel card (e.g., a name of a vendor), (iii) hardware components of the channel card (e.g., identifiers for standard and/or unique hardware elements), (iv) firmware of the channel card (e.g., names and/or descriptions of applications hosted by the hardware components), (v) current configurations of the channel card (e.g., settings for operations, settings for interactions with other hardware components), and/or (vi) other information.

Parameters of data processing system 200 and parameters of channel card 202 may be obtained by the management controller via sideband channels of the data processing system (e.g., similar to sideband channels 174 described in FIG. 1B.

To determine whether any modifications are to be made to configurations of the channel card, the management controller may perform operational scenario evaluation process 204. During operational scenario evaluation process 204, a set of operational scenarios for the data processing system with respect to the channel card may be evaluated. The set of operational scenarios may be obtained, by the management controller, based on historic operation of the data processing system, based on user and/or vendor feedback, and/or based on other information. The set of operational scenarios may include: (i) sequences of events that may typically involve cooperative interactions between a channel card and at least one other component of the data processing system, (ii) sequences of events that historically occur most frequently for the data processing system, and/or (iii) other sequences of events. Therefore, if configurations of the non-standard channel card interfere with the cooperative interactions, the data processing system may not operate as desired.

For example, operational scenarios may include: (i) the hardware resources of the data processing system becoming depowered, (ii) a loss of connectivity to a communication system for the data processing system (e.g., a loss of connection to the Internet), (iii) addition of other hardware components with which the channel card is expected to perform operations cooperatively, (iv) transfer of ownership to a new user of the data processing system, and/or (v) other scenarios.

During operational scenario evaluation process 204, the management controller may determine a potential result (e.g., a most likely outcome and/or a set of possible outcomes with varying degrees of probability of occurring) for each operational scenario of the set of operational scenarios in view of configurations of the channel card (e.g., indicated by parameters of channel card 202) and parameters of data processing system 200.

Operation scenario outcomes 206 may include the likely outcomes. The likely outcomes indicated by operation scenario outcomes 206 may include: (i) a status of the channel card and/or the data processing system following each corresponding operational scenario, (ii) operations performed and/or not performed by the hardware components and/or the management controller, (iii) a status of data managed by the channel card and/or the other hardware resources, and/or (iv) other information.

For example, if the operational scenario includes the hardware resources becoming unpowered, a corresponding operation scenario outcome of operation scenario outcomes 206 may include an impact of the depowering on the channel card on the hardware components and/or data managed by the hardware components. Parameters of channel card 202 may indicate that the channel card is configured to store data in volatile memory rather than non-volatile storage (e.g., flash storage). In addition, parameters of data processing system 200 may indicate that the data processing system does not have a backup battery component in the event of power loss for the hardware resources.

Therefore, the corresponding operation scenario outcome of operation scenario outcomes 206 may indicate that data stored in the volatile memory of the channel card may be lost.

Any number of operation scenario outcomes may be obtained for any number of operational scenarios. For example, multiple operation scenario outcomes may be identified for each operational scenario. Each operational scenario and operation scenario outcome may be based on the unique capabilities and restrictions of the data processing system and the channel card and may be based on events that may occur during operation of the data processing system.

To determine whether any configurations of the channel card are to be modified in view of operation scenario outcomes 206, comparison process 208 may be performed. During comparison process 208, operation scenario outcomes 206 may be compared to desired manner of operation 210.

Desired manner of operation 210 may indicate aspects of operation of the channel card that are considered acceptable and/or desired by a user of the data processing system and/or another entity. Desired manner of operation 210 may include information at any level of granularity including, for example, desired outcomes corresponding to operational scenarios of the set of the operational scenarios and/or more general information indicating a manner in which the channel card is to operate to facilitate desired performance of the data processing system and/or desired provisioning of the computer-implemented services.

For example, desired manner of operation 210 may indicate that data stored by the channel card is to be retained in the event of a depowering event for the hardware resources. In this example, during comparison process 208, it may be identified that one of operation scenario outcomes 206 does not meet at least a portion of desired manner of operation 210. Desired manner of operation 210 may include any amount of information related to a desired outcome in the event of depowering of the hardware resources. For example, desired manner of operation 210 may indicate specific types of data that are to be retained, thresholds for amounts of data loss that are considered acceptable, and/or other information.

During comparison process 208, any number of operation scenario outcomes that do not meet desired manner of operation 210 may be flagged by the management controller. For each operation scenario outcome that is flagged, the management controller may determine whether modifications are to be made to configurations of the channel card to attempt to reduce a likelihood of future occurrences of the flagged operation scenario outcomes. For example, modification 212 may be obtained as a result of comparison process 208. To obtain modification 212, it may be identified that a configuration of the channel card may be modified so that data stored by the channel card is stored in the non-volatile storage rather than the volatile memory of the channel card. By implementing this modification, a likelihood that data may be lost in the event of a depowering event for the data processing system may be reduced.

Consequently, modification 212 may include a description of the configuration of the channel that is to be modified (e.g., a storage location for particular types of data). While described with respect to a single configuration of the channel card, modification 212 may include modifications to any number of additional configurations of the channel card without departing from embodiments disclosed herein.

By doing so, the management controller may implement modification 212 to update operation of the data processing system. Subsequently, computer-implemented services may be more likely to be provided as desired by the user of the data processing system (e.g., in view of desired manner of operation 210).

Turning to FIG. 2B, a second data flow diagram in accordance with an embodiment is shown. The second data flow diagram may illustrate data used in and data processing performed in a second example of identifying a modification to be made to a data processing system with respect to a channel card operably connected to the data processing system.

Consider a scenario in which a channel card operably connected to a data processing system is a non-standard channel card (e.g., performs at least one function in addition to functions based on an industry standard for a type of the channel card. For example, the type of the channel card may be a GPU (e.g., a graphics card).

Following operable connection of the graphics card to the data processing system, a management controller may evaluate a manner in which components of the data processing system (e.g., a startup management entity, the management controller, other hardware components) are able to interact with the channel card during startup procedures for the data processing system. For example, during startup of the data processing system, the management controller may perform various processes. Specifically, the management controller may evaluate a health status of each hardware component of hardware resources of the data processing system during the startup by obtaining diagnostic data for each of the hardware components.

However, the startup management entity for the data processing system (e.g., a BIOS) may determine whether to allow diagnostic firmware of the channel card to run during startup, whether to allow communication channels to be open between the management controller and the channel card during startup, etc. Therefore, if the BIOS does not allow diagnostic data for the channel card to be obtained by the management controller during startups, the management controller may be unable to perform the diagnostic data retrieval process as planned.

To identify functions of the channel card supported by the startup management entity during startups, the management controller may perform startup evaluation process 220. During startup evaluation process 220, parameters of data processing system 200 and parameters of channel card 202 may be obtained. Parameters of channel card 202 may include, for example, diagnostic firmware and/or software hosted by the channel card, communication channels available to the channel card, etc. Parameters of data processing system 200 may include policies for managing startups with respect to different types of channel cards by the BIOS, etc. Refer to FIG. 2A for details regarding parameters of data processing system 200 and parameters of channel card 202.

Based on parameters of channel card 202 and parameters of data processing system 200, the management controller may interact with the BIOS, the channel card, and/or other hardware components during startup evaluation process 220 to obtain restrictions for channel card 224. Specifically, based on a type of the channel card and/or other characteristics of the channel card (e.g., a non-standard channel card manufactured by a particular manufacturer/vendor), the management controller may identify a corresponding set of features supported by the BIOS during startup evaluation process 220.

Restrictions for channel card 224 may include the features supported and/or not supported by the BIOS. For example, the features supported by the BIOS may include: (i) firmware and/or software allowed to run on the channel card during startups, (ii) a limit on types of communication mechanisms available during the startups (e.g., communication channels open/closed), (iii) diagnostic and/or security operations to be performed by the BIOS during the startups, and/or (iv) other information.

For example, restrictions for channel card 224 may indicate that, due to the non-standard channel card being manufactured by a manufacturer not authorized by the BIOS, the management controller may not be able to retrieve diagnostic data from the channel card during startups due to one or more communication channels being inoperable (e.g., as determined by the startup management entity with respect to parameters of channel card 202) and/or due to a policy prohibiting diagnostic firmware to run on the channel card during the startups. A particular communication channel may be inoperable during startups, for example, due to a lack of trust between the BIOS and the channel card.

To determine whether any modifications are to be made to a manner in which the management controller operates during startups with respect to the channel card (e.g., to increase a likelihood of performing desired operations), modification identification process 226 may be performed. During modification identification process 226, restrictions for channel card 224 may be compared to desired operation of management controller 222 to determine whether any portion of restrictions for channel card 224 reduces a likelihood that any portion of desired operation of management controller 222 is to occur.

For example, desired operation of management controller 222 may include any number of plans for operations to be performed by the management controller during startups of the data processing system. Specifically, desired operation of management controller 222 may include retrieval, by the management controller, of diagnostic data from the channel card during startups via a particular communication channel (e.g., a sideband channel).

During modification identification process 226, for example, it may be determined that the sideband channels indicated by desired operation of management controller 222 are inoperable during startups as indicated by restrictions for channel card 224 thereby reducing a likelihood that the management controller is able to complete the diagnostic data retrieval during startups. Consequently, modification 228 may be obtained.

Modification 228 may include one or more actions to be performed to modify operation of the management controller with respect to the channel card during startups. For example, modification 228 may indicate that a diagnostic data retrieval plan of the management controller is to be updated so that the management controller obtains the diagnostic data from the channel card via another communication channel and/or at another time (e.g., after the startup is complete). Modification 228 may include any number of modifications to a manner in which the management controller interacts with the channel card during startups.

By doing so, management functions performed by the management controller may be more likely to be completed and, therefore, a likelihood of the data processing system providing the computer-implemented services as expected may be increased. For example, the management controller may limit functionality of a hardware component if the management controller is unable to obtain diagnostic data for the hardware component during startups. Therefore, determining a procedure for obtaining the diagnostic data from the non-standard channel card may reduce a likelihood of the functionality of the channel card being limited for users of the data processing system.

Turning to FIG. 2C, a third data flow diagram in accordance with an embodiment is shown. The third data flow diagram may illustrate data used in and data processing performed in a third example of identifying a modification to be made to a data processing system with respect to a channel card operably connected to the data processing system.

Consider a scenario in which a channel card operably connected to a data processing system is a non-standard channel card (e.g., performs at least one function in addition to functions based on an industry standard for a type of the channel card. For example, the type of the channel card may be a GPU (e.g., a graphics card).

Following operable connection of the graphics card to the data processing system, a management controller may manage a user's experience while utilizing the data processing system by identifying functions (e.g., standard functions, non-standard functions) of the channel card and a user-facing description for the functions. The user-facing descriptions of the functions may include icons displayed by software applications, names of the functions provided by software applications, and/or other methods through which the data processing system presents the functions to a user of the data processing system (e.g., via a display of the data processing system, via a GUI).

As previously described, non-standard channel cards may be manufactured by a manufacturer that is different from a manufacturer of the data processing system. The channel card may, therefore, perform standard functions that are substantially similar to functions based on an industry standard for a type of the channel card and at least one additional non-standard function.

In an embodiment, functions of channel cards are substantially similar when an outcome of a first function of the functions is within a one percent deviation of an outcome of a second function of the functions.

In an embodiment, functions of channel cards are substantially similar when an outcome of a first function of the functions is within a three percent deviation of an outcome of a second function of the functions.

In an embodiment, functions of channel cards are substantially similar when an outcome of a first function of the functions is within a five percent deviation of an outcome of a second function of the functions.

However, the non-standard channel card may present its standard functions using user-facing descriptions that differ from user-facing descriptions of the standard functions by channel cards manufactured by the manufacturer of the data processing system.

For example, a standard function of a channel card may be included in a list of specifications for the channel card available for viewing by the user via a software application that aggregates specifications for hardware components of the data processing system. However, the manufacturer of the channel card may select a name for the standard function that does not match a name utilized by the manufacturer of the data processing system to represent a substantially similar function. In addition, two or more functions of the non-standard channel card may, in aggregate, be substantially similar to a standard function. However, the user of the data processing system may not recognize the function(s), may not activate and/or utilize the function(s), and/or may otherwise have a reduced-quality experience while utilizing the data processing system.

To determine whether any functions of the channel card correspond to standard functions of a standard channel card, function identification process 230 may be performed. During function identification process 230, the management controller may interact with the channel card (and/or another entity) to obtain a list of the functions of the channel card and corresponding descriptions of the functions. To do so, the management controller may request information from the channel card via a sideband channel. By comparison to a list of standard functions and corresponding descriptions of the standard functions, the management controller may identify any functions of the channel card that correspond to (e.g., are substantially similar to) the standard functions. During function identification process 230, the management controller may also identify whether any of the functions that correspond to the standard functions have different user-facing descriptions than user-facing descriptions of the standard functions.

A user-facing description of a function may include a manner in which an application presents the function to the user (e.g., via a GUI), a name for the function, an icon for the function, a human-interpretable text description of the function, etc.

By doing so, function 232 may be obtained. Function 232 may include any amount of information related to functions of the channel card that correspond to standard functions but have different user-facing descriptions than the corresponding standard functions. Function 232 may indicate, for example, that a function of the channel card is presented (e.g., by an application) to the user using a different name and icon than a name and icon for a corresponding standard function. The application may utilize the channel card during operation and, therefore, the user may be presented with a user-facing description that is unfamiliar and/or inconsistent with user-facing descriptions of features of other hardware components (e.g., standard channel cards) currently and/or previously used by the user.

To determine whether any modifications are to be made to improve the user's experience while utilizing the data processing system, modification identification process 234 may be performed. During modification identification process 234, an action set for modifying the user-facing description of the function(s) identified by function 232 may be obtained.

Modification 236 may indicate, for example, that a manner in which an application presents information regarding the function to the user is to be modified. In addition, modification 236 may indicate that a name of the function is to be modified based on a name of the corresponding standard function, an icon for the function is to be modified based on an icon for the corresponding standard function, and/or other modifications are to be made.

For example, two or more functions of the channel card may be grouped and re-named for presentation to the user via a GUI. In addition, an icon for one or more functions may be hidden, removed, and/or replaced with another icon.

By doing so, the user's experience may be improved while utilizing the data processing system. By modifying the user-facing description of functions of the channel card, substantially similar functions may be presented to the user using the same name, icon, etc. Therefore, the user may recognize the functions across various hardware components of the data processing system and may be more likely to be able to utilize the functions as desired. Consequently, computer-implemented services provided based, at least in part, on operation of the channel card may be more likely to be provided as desired by the user.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes.

Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1B may perform various methods to manage operation of a data processing system. FIG. 3 illustrates a method that may be performed by the components of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method in accordance with an embodiment is shown. The flow diagram may illustrate various operations performed while modifying operation of a data processing system with respect to a non-standard channel card operably connected to the data processing system. The data processing system may include hardware resources (including any number of channel cards) and a management controller, and may be similar to the data processing system discussed with respect to FIGS. 1A-1B.

At operation 300, parameters of a channel card of the data processing system may be obtained, the channel card having at least one non-standard function based on standard functions of a type of the channel card. Obtaining the parameters of the channel card may include: (i) reading the parameters of the channel card from storage, (ii) receiving the parameters of the channel card as a message over a communication channel (e.g., a sideband channel of the data processing system), and/or (iii) other methods.

At operation 302, at least one modification to the data processing system may be identified based on the parameters of the channel card and parameters of the data processing system. Prior to identifying the at least one modification to the data processing system, the parameters of the data processing system may be obtained. Obtaining the parameters of the data processing system may include: (i) reading the parameters of the data processing system from storage, (ii) receiving the parameters of the data processing system as a message over a communication channel, and/or (iii) other methods. Identifying the at least one modification to the data processing system may include interactions via a sideband channel of the data processing system.

In a first example, identifying the at least one modification to the data processing system may include: (i) identifying a desired manner of operation of the channel card when operably connected to the data processing system, (ii) evaluating, based on the parameters of the channel card and the parameters of the data processing system, a set of operational scenarios to obtain operation scenario outcomes, (iii) comparing the operation scenario outcomes to the desired manner of operation of the channel card, (iv) if at least one of the operation scenario outcomes does not meet the desired manner of operation, identifying a change in configuration for the channel card that, when applied to channel card, reduces a likelihood of additional instances of the operation scenario outcomes not meeting the desired manner of operation to obtain the at least one modification, and/or (v) other methods.

Identifying the desired manner of operation of the channel card may include: (i) reading the desired manner of operation of the channel card from storage, (ii) receiving, as a message over a communication channel (e.g., a sideband channel, an out-of-band communication channel), the desired manner of operation of the channel card from an entity (e.g., the channel card, other hardware components of the data processing system, a remote entity such as the vendor, the user), (iii) generating the desired manner of operation of the channel card based on user input, historic operation of the channel card, and/or other information, and/or (iv) other methods.

Evaluating the set of operational scenarios may include: (i) obtaining the set of operational scenarios, (ii) obtaining an operation scenario outcome for each operational scenario of the set of operational scenarios, and/or (iii) other methods.

Obtaining the set of operational scenarios may include: (i) reading the set of operational scenarios from storage, (ii) receiving the set of operational scenarios from another entity as a message over a communication channel, (iii) generating the set of operational scenarios based on historic data indicating events for the data processing system that meet certain criteria (e.g., events that typically involve cooperative interactions between a channel card and one or more other components of the data processing system, events that occur most frequently over time), and/or (iv) other methods.

Obtaining the operation scenario outcome for each operational scenario of the set of operational scenarios may include: (i) identifying portions of the parameters of the channel card and portions of the parameters of the data processing system that may be impacted by each operational scenario, (ii) generating (e.g., using a rule set, inference model, probabilistic model, and/or other method) an operation scenario outcome based on a potential result (e.g., a potential result with a highest likelihood of occurring, multiple potential results with varying likelihoods of occurring) of the operational scenario for the data processing system, and/or (iii) other methods. Obtaining the operational scenario outcome for each operational scenario of the set of operational scenarios may also include: (i) reading the operation scenario outcomes from storage, (ii) receiving the operation scenario outcomes from another entity responsible for identifying the potential results, and/or (iii) other methods.

For example, parameters of the of the channel card and the parameters of the data processing system may be fed into an inference model trained to generate operation scenario outcomes. The inference model may also ingest the set of operational scenarios and may generate, for each operational scenario, an operation scenario outcome in the context of the parameters of the channel card and the parameters of the data processing system.

Comparing the operation scenario outcomes to the desired manner of operation may include: (i) identifying any of the operation scenario outcomes that conflict (e.g., by exceeding any number of thresholds for acceptability of the operation scenario outcomes) with at least a portion of the desired manner of operation of the channel card, (ii) providing the operation scenario outcomes and the desired manner of operation to another entity responsible for comparing the operation scenario outcomes and the desired manner of operation, and/or (iii) other methods.

Identifying the change in configuration for the channel card may include: (i) obtaining a list of current configurations of the channel card, (ii) parsing the list of the current configurations to identify configurations relevant to the identified operation scenario outcome, (iii) determining a change to the identified configurations that may reduce a likelihood of the identified operation scenario outcome from occurring in the future, and/or (iv) other methods.

In a second example, identifying the at least one modification to the data processing system may include: (i) identifying a desired operation to be performed by the management controller and with respect to the channel card during startups of the data processing system, (ii) identifying at least one restriction placed on the channel card during the startups, (iii) identifying, based on the at least one restriction, a manner for completing the desired operation during the startups, and/or (iv) other methods.

Identifying the desired operation to be performed by the management controller and with respect to the channel card during startups of the data processing system may include: (i) obtaining a list of desired operations to be performed by the management controller (e.g., reading the list from storage, requesting the list from the management controller and/or from another entity, generating the list based on historic behavior of the management controller and/or based on feedback from a user and/or other entity), (ii) searching the list of desired operations (e.g., using a key word such as "startup" and/or "channel card") to identify desired operations to be performed during startups and with respect to the channel card, and/or (iii) other methods.

Identifying the at least one restriction placed on the channel card during the startups may include: (i) reading the at least one restriction from storage, (ii) querying a startup management entity (e.g., a BIOS) to obtain polices for hardware components during startups, (iii) parsing the obtained polices to identify any of the policies that apply to the channel card, (iv) reading the policies that apply to the channel card to determine whether any restrictions are placed on the channel card (e.g., software and/or firmware restrictions, available communication mechanism restrictions), and/or (v) other methods.

Identifying, based on the at least one restriction, a manner for completing the desired operation during the startups may include identifying a modification to a plan for the management controller to complete the desired operation so that the management controller is able to complete the desired operation during startup. Identifying the modification may include: (i) identifying one or more alternate methods of completing the desired operation (e.g., based on configurations and/or policies of the management controller and the channel card), (ii) selecting an alternate method of the one or more alternate methods based on any criteria (e.g., reduction of computing resource expenditure), and/or (iii) other methods.

Identifying the manner for completing the desired operation may also include providing the at least one restriction to another entity responsible for managing plans for the management controller to complete desired operations and receiving the manner for completing the desired operation during startups as a response from the entity.

In a third example, identifying the at least one modification may include: (i) identifying a function of the channel card that corresponds to a standard function of standard functions of the type of the channel card, and/or (ii) other methods. The function may have a user-facing description that differs from a user-facing description of the standard function.

Identifying the function of the channel card may include: (i) performing a function identification process to obtain a list of functions of the channel card (e.g., querying the channel card to provide the functions, querying a vendor of the channel card to obtain the functions), (ii) obtaining a list of the standard functions (e.g., from storage, from another entity via a communication system), (iii) comparing the list of functions of the channel card to the list of the standard functions to identify any functions of the list of functions of the channel card that correspond (e.g., individually or in aggregate with other functions of the channel card) to functions of the list of the standard functions, (iv) determining whether any of the identified functions that correspond to standard functions have user-facing descriptions that differ from user-facing descriptions of the corresponding standard functions, and/or (v) other methods. A function may correspond to a standard function if a description of the function (and/or group of functions) achieve similar goals (e.g., within a similarity threshold) and/or otherwise have a degree of similarity that meets a similarity threshold.

At operation 304, an action set may be performed based on the at least one modification, to update operation of the data processing system.

In the first example, performing the action set may include applying, based on the at least one modification, the identified change in configuration to the channel card and/or other methods. Applying the identified change in configuration to the channel card may include: (i) directly and/or indirectly modifying one or more configurations of the channel card, (ii) providing instructions to the channel card to modify one or more configurations of the channel card, (iii) providing instructions to another entity responsible for modifying the configurations of the channel card, and/or (iv) other methods.

In the second example, performing the action set may include updating a diagnostic data retrieval plan of the management controller based on the identified manner for completing the desired operation and/or other methods. Updating the diagnostic data retrieval plan may include: (i) modifying the diagnostic data retrieval plan and/or appending new information to update the diagnostic data retrieval plan in storage for the management controller based on the identified modification, (ii) providing the updated diagnostic data retrieval plan to the management controller along with instructions for updating and/or replacing the prior diagnostic data retrieval plan, (iv) providing the updated diagnostic data retrieval plan to another entity responsible for managing operation of the management controller and/or, (v) other methods.

In the third example, performing the action set may include: (i) modifying a manner in which an application presents information regarding the function to a user of the data processing system, and/or (ii) other methods. The application may utilize the channel card during operation.

Modifying the manner in which the application presents information regarding the function to the user may include: (i) modifying configurations of the software application, (ii) modifying information included in a user interface (e.g., a GUI) presented to the user by the software application and with respect to the functions of the channel card, (iii) modifying a list of specifications for the channel card that is available to the user, and/or (iv) other methods.

Performing the action set may also include: (i) modifying a name of the function based on a name of the corresponding standard function, (ii) modifying an icon for the function based on an icon for the corresponding standard function, and/or (iii) other methods.

Modifying the name of the function (and/or a group of functions that collectively correspond to the standard function) may include: (i) replacing the name of the function with the name of the standard function (e.g., for display on a GUI), (ii) removing the name of the function (e.g., from a GUI), (iii) modifying configurations of a software application so that the name of the function is hidden for some of the user interfaces through which the function may be presented to the user, (iv) providing instructions to another entity responsible for modifying GUIs, and/or (v) other methods.

Modifying the icon for the function may include: (i) replacing the icon for the function with the icon for the standard function (e.g., for display on a GUI), (ii) removing the icon for the function from (e.g., from a GUI), (iii) modifying configurations of a software application so that the icon for the function is hidden for some of the user interfaces through which the function may be presented to the user, (iv) providing instructions to another entity responsible for modifying GUIs, and/or (v) other methods.

At operation 306, computer-implemented services may be provided based on the updated operation of the data processing system. Providing the computer-implemented services may include: (i) performing any number of cooperative operations and/or interactions based on functions to be made available to the user of the data processing system (e.g., data storage services, instant messaging services, database services, data generation services), (ii) generating and presenting GUIs to the user via a display of the data processing system, (iii) receiving user feedback from the user and via the GUI and any number of human interface devices of the data processing system, and/or (iv) other methods.

The method may end following operation 306.

Thus, modifications may be made to data processing systems based on functions of non-standard channel cards to increase a likelihood of computer-implemented services being provided as desired. As non-standard channel cards may have configurations, restrictions, user-facing descriptions, and/or other characteristics that may interrupt and/or adversely impact cooperative operation of the hardware components, modifying the data processing system (e.g., modifying configurations of channel cards, modifying a manner in which other hardware components interact with the channel cards, modifying the user-facing description of the channel cards on GUIs) may increase a likelihood that the hardware components may cooperatively interact as desired to provide computer-implemented services to users.

Figure 4:
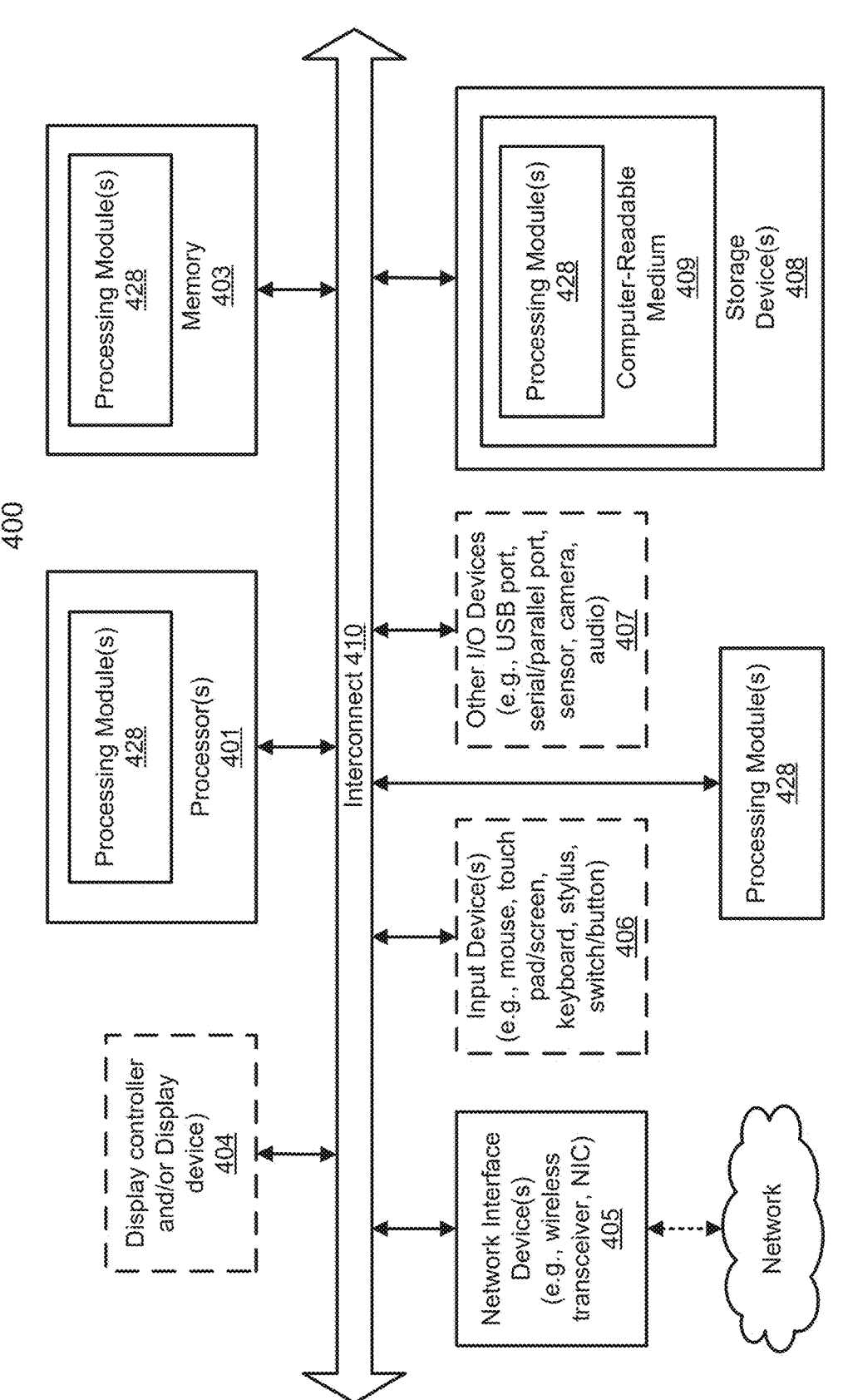
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., basic input/output system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output system (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
obtaining, by a management controller that is physically installed within the data processing system, parameters of a channel card of the data processing system, the channel card having at least one non-standard function based on standard functions of a type of the channel card, the management controller being a separate and independently operating computing device from the data processing system, and the management controller comprising a first processor that is separate and independently operating from a second processor of the data processing system;
identifying, by the management controller and based on the parameters of the channel card and parameters of the data processing system, at least one modification to the data processing system;
performing, by the management controller and based on the at least one modification, an action set to update operation of the data processing system; and causing, by the management controller, the data processing system to provide computer-implemented services based on the updated operation of the data processing system.

2. The method of claim 1, wherein the parameters of the channel card comprise at least one parameter selected from a list of parameters consisting of:
the type of the channel card;
a manufacturer of the channel card;
hardware components of the channel card; and
firmware of the channel card.

3. The method of claim 1, wherein identifying the at least one modification comprises, in a first instance when the at least one modification is a first modification:
identifying a desired manner of operation of the channel card when operably connected to the data processing system;
evaluating, based on the parameters of the channel card and the parameters of the data processing system, a set of operational scenarios to obtain operation scenario outcomes;
comparing the operation scenario outcomes to the desired manner of operation; and
in an instance of the comparing where at least one of the operation scenario outcomes does not meet the desired manner of operation:
identifying a change in configuration for the channel card that, when applied to channel card, reduces a likelihood of additional instances of the comparing from occurring to obtain the at least one modification.

4. The method of claim 3, wherein performing the action set comprises, in the first instance where the at least one modification identified is the first modification:
applying, by the management controller and based on the at least one modification, the identified change in configuration for the channel card.

5. The method of claim 1, wherein identifying the at least one modification comprises, in a second instance when the at least one modification is a second modification:
identifying a desired operation to be performed by the management controller and with respect to the channel card during startups of the data processing system;
identifying at least one restriction placed on the channel card during the startups; and
identifying, based on the at least one restriction, a manner for completing the desired operation during the startups.

6. The method of claim 5, wherein the desired operation is retrieval, by the management controller, of diagnostic data from the channel card.

7. The method of claim 6, wherein performing the action set comprises, in the second instance where the at least one modification identified is the second modification:
updating a diagnostic data retrieval plan of the management controller based on the identified manner for completing the desired operation.

8. The method of claim 7, wherein the at least one restriction is a limit on types of communication mechanisms available during the startups.

9. The method of claim 1, wherein identifying the at least one modification comprises, in a third instance when the at least one modification is a third modification:
identifying a function of the channel card that corresponds to a standard function of the standard functions, the function having a user-facing description that differs from a user-facing description of the standard function.

10. The method of claim 9, wherein performing the action set comprises at least one action selected from a list of actions consisting of, in the third instance where the at least one modification identified is the third modification:

modifying a name of the function based on a name of the corresponding standard function; and modifying an icon for the function based on an icon for the corresponding standard function.

11. The method of claim 9, wherein performing the action set comprises, in the third instance where the at least one modification identified is the third modification:

modifying a manner in which an application presents information regarding the function to a user of the data processing system, the application utilizing the channel card during operation.

12. The method of claim 1, wherein at least the obtaining, identifying, and performing are performed via a sideband channel of the data processing system.

13. A non-transitory machine-readable medium having instructions stored therein, which when executed by a processor, cause the processor to perform operations for managing operation of a data processing system, the operations comprising:

obtaining, by a management controller that is physically installed within the data processing system, parameters of a channel card of the data processing system, the channel card having at least one non-standard function based on standard functions of a type of the channel card, the management controller being a separate and independently operating computing device from the data processing system, and the management controller comprising a first processor that is separate and independently operating from a second processor of the data processing system;

identifying, by the management controller and based on the parameters of the channel card and parameters of the data processing system, at least one modification to the data processing system;

performing, by the management controller and based on the at least one modification, an action set to update operation of the data processing system; and causing, by the management controller, the data processing system to provide computer-implemented services based on the updated operation of the data processing system.

14. The non-transitory machine-readable medium of claim 13, wherein the parameters of the channel card comprise at least one parameter selected from a list of parameters consisting of:

the type of the channel card;

a manufacturer of the channel card;

hardware components of the channel card; and firmware of the channel card.

15. The non-transitory machine-readable medium of claim 13, wherein identifying the at least one modification comprises, in a first instance when the at least one modification is a first modification:

identifying a desired manner of operation of the channel card when operably connected to the data processing system;

evaluating, based on the parameters of the channel card and the parameters of the data processing system, a set of operational scenarios to obtain operation scenario outcomes;

comparing the operation scenario outcomes to the desired manner of operation; and in an instance of the comparing where at least one of the operation scenario outcomes does not meet the desired manner of operation:

identifying a change in configuration for the channel card that, when applied to channel card, reduces a likelihood of additional instances of the comparing from occurring to obtain the at least one modification.

16. The non-transitory machine-readable medium of claim 15, wherein performing the action set comprises, in the first instance where the at least one modification identified is the first modification:

applying, by the management controller and based on the at least one modification, the identified change in configuration for the channel card.

17. A data processing system, comprising:

a first processor coupled to first memory;

a management controller comprising a second processor that is separate and independently operating from the first processor of the data processing system, the management controller being physically installed within the data processing system as a separate and independently operating computing device from the data processing system; and second memory coupled to the second processor, wherein the second processor stores instructions, which when executed by the second processor, cause the second processor to perform operations, the operations comprising:

obtaining, by the management controller parameters of a channel card of the data processing system, the channel card having at least one non-standard function based on standard functions of a type of the channel card;

identifying, by the management controller and based on the parameters of the channel card and parameters of the data processing system, at least one modification to the data processing system;

performing, by the management controller and based on the at least one modification, an action set to update operation of the data processing system; and causing, by the management controller, the data processing system to provide computer-implemented services based on the updated operation of the data processing system.

18. The data processing system of claim 17, wherein the parameters of the channel card comprise at least one parameter selected from a list of parameters consisting of:

the type of the channel card;

a manufacturer of the channel card;

hardware components of the channel card; and firmware of the channel card.

19. The data processing system of claim 17, wherein identifying the at least one modification comprises, in a first instance when the at least one modification is a first modification:

identifying a desired manner of operation of the channel card when operably connected to the data processing system;

evaluating, based on the parameters of the channel card and the parameters of the data processing system, a set of operational scenarios to obtain operation scenario outcomes;

comparing the operation scenario outcomes to the desired manner of operation; and in an instance of the comparing where at least one of the
    operation scenario outcomes does not meet the desired
    manner of operation:
    identifying a change in configuration for the channel
        card that, when applied to channel card, reduces a
        likelihood of additional instances of the comparing
        from occurring to obtain the at least one modifica-
        tion.

20. The data processing system of claim 19, wherein
performing the action set comprises, in the first instance
where the at least one modification identified is the first
modification:
    applying, by the management controller and based on the
        at least one modification, the identified change in
        configuration for the channel card.

*  *  *  *  *